United States Patent [19]

Frank

[11] 3,875,926

[45] Apr. 8, 1975

[54] SOLAR THERMAL ENERGY COLLECTION SYSTEM

[76] Inventor: Matthew William Frank, 745 S. 44th, Boulder, Colo. 80303

[22] Filed: Feb. 21, 1974

[21] Appl. No.: 444,407

[52] U.S. Cl. .............. 126/271; 122/366; 165/105; 202/234; 203/DIG. 1
[51] Int. Cl. ............................................ F24j 3/02
[58] Field of Search ..... 126/271; 122/366; 165/105; 202/234; 203/4, 10, 100, DIG. 1; 237/1 A

[56] References Cited
UNITED STATES PATENTS

| | | | |
|---|---|---|---|
| 502,729 | 8/1893 | Kreusler | 122/366 |
| 1,162,505 | 11/1915 | Nichols | 126/271 |
| 1,987,119 | 1/1935 | Long | 265/105 UX |
| 2,141,330 | 12/1938 | Abbot | 202/234 X |
| 2,205,378 | 6/1940 | Abbot | 126/271 |
| 2,360,665 | 10/1944 | Fields | 165/105 |
| 2,363,118 | 11/1944 | Chamberlain | 165/105 X |
| 2,872,915 | 2/1959 | Bowen | 126/271 |
| 3,300,393 | 1/1967 | Fisher | 203/10 |
| 3,359,183 | 12/1967 | Kenk | 203/10 X |
| 3,390,672 | 7/1968 | Snelling | 126/271 |
| 3,490,996 | 1/1970 | Kelly, Jr. | 202/234 |
| 3,799,144 | 3/1974 | Ramsey et al. | 165/105 X |

*Primary Examiner*—William F. O'Dea
*Assistant Examiner*—Peter D. Ferguson
*Attorney, Agent, or Firm*—Van Valkenburgh, Lowe & Law

[57] ABSTRACT

An application and a method for receiving and transmitting thermal solar energy. A collector of solar energy reflects solar energy to a heat pipe which transmits vapor produced therein to a condenser to release and utilize the thermal energy carried by the vapor either to perform heating functions or to be dissipated as the vapor is condensed.

5 Claims, 12 Drawing Figures

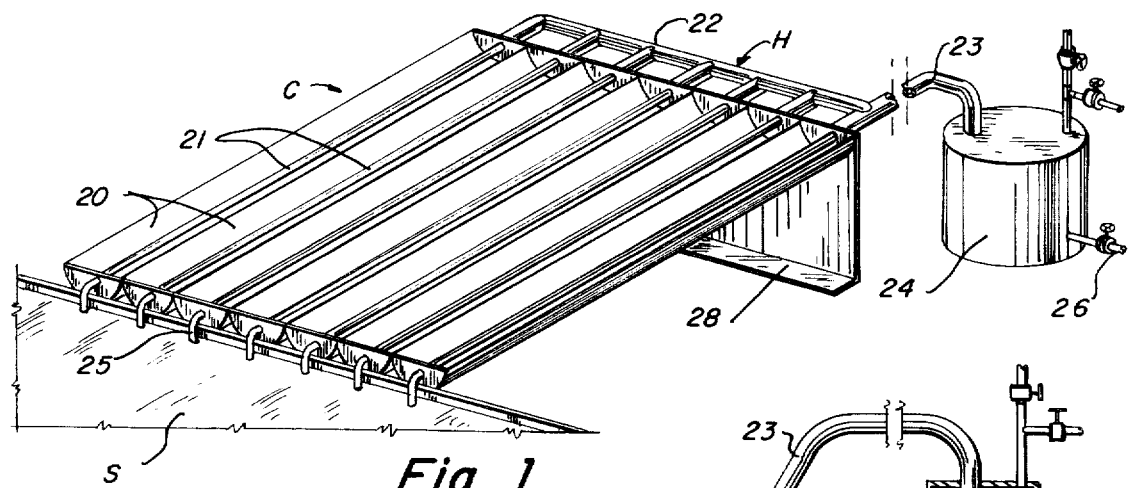
Fig_1
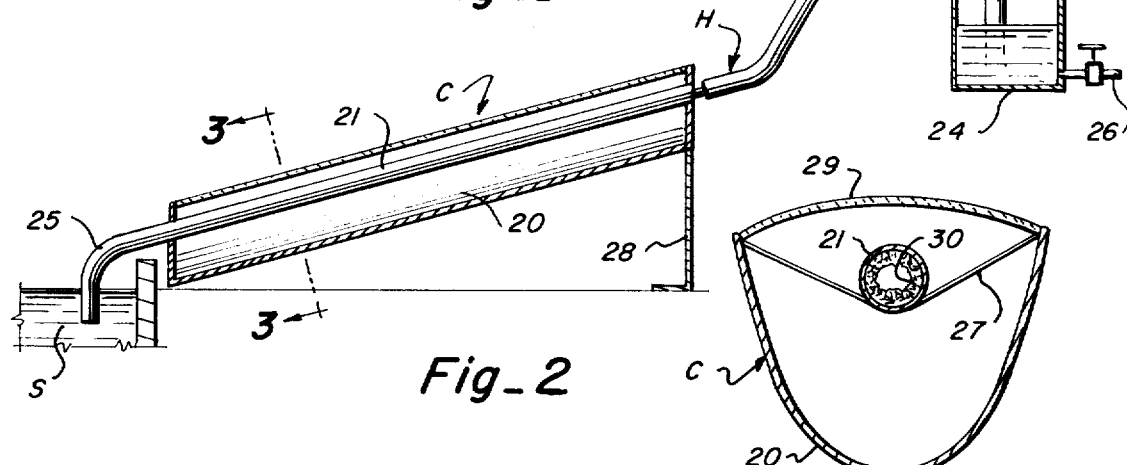
Fig_2
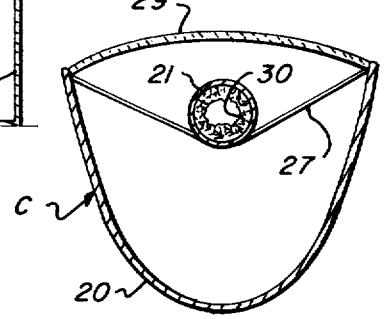
Fig_3
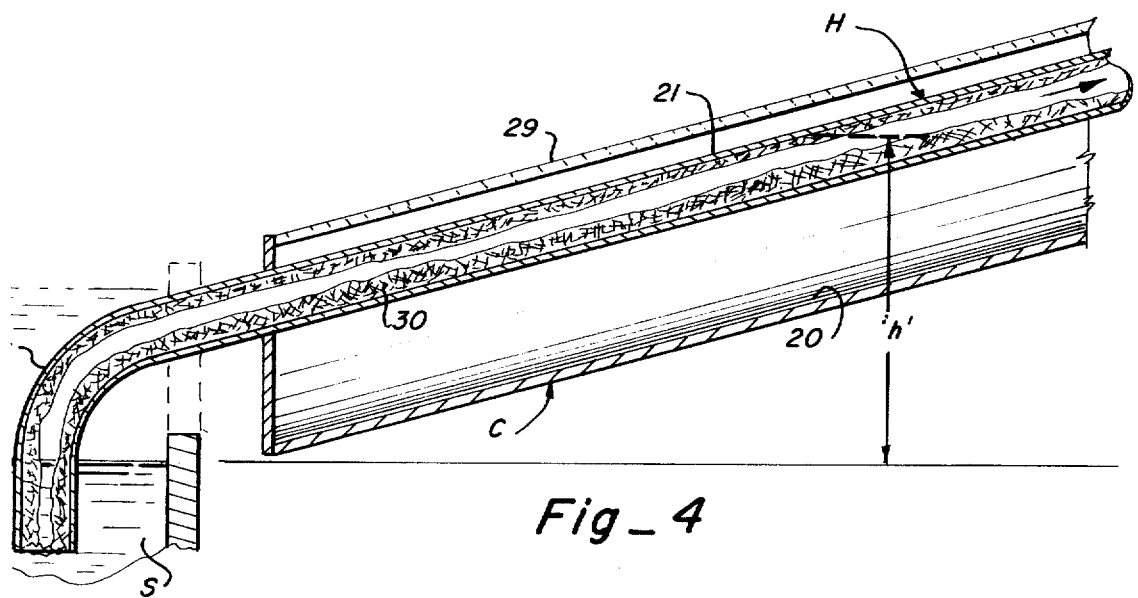
Fig_4

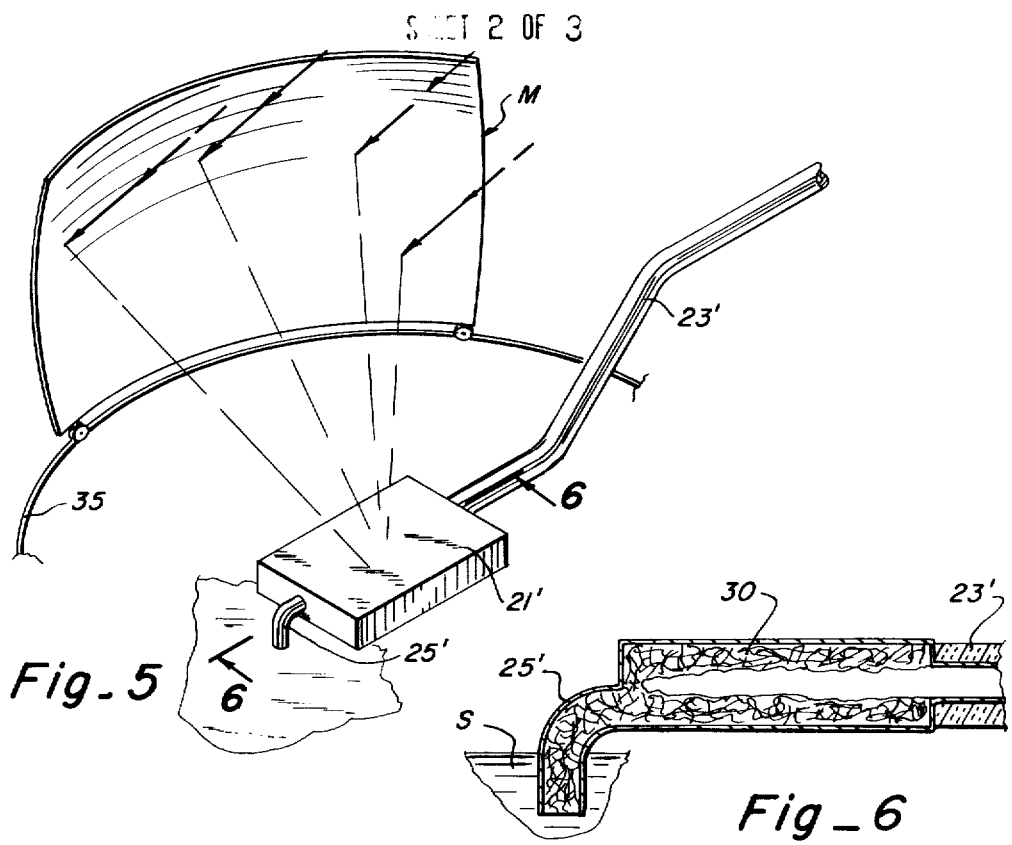
Fig_5
Fig_6
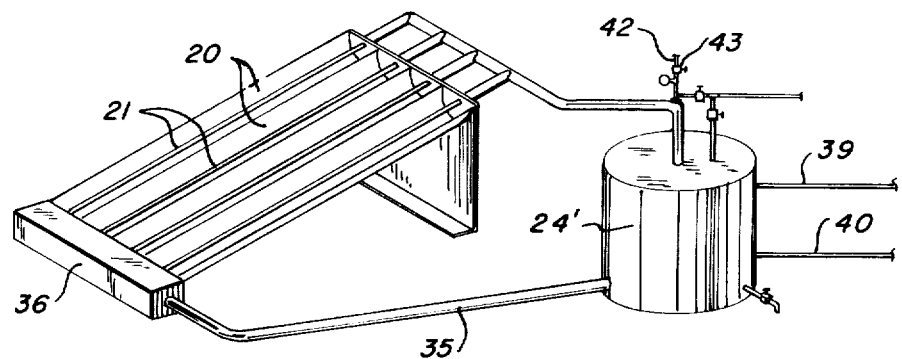
Fig_7
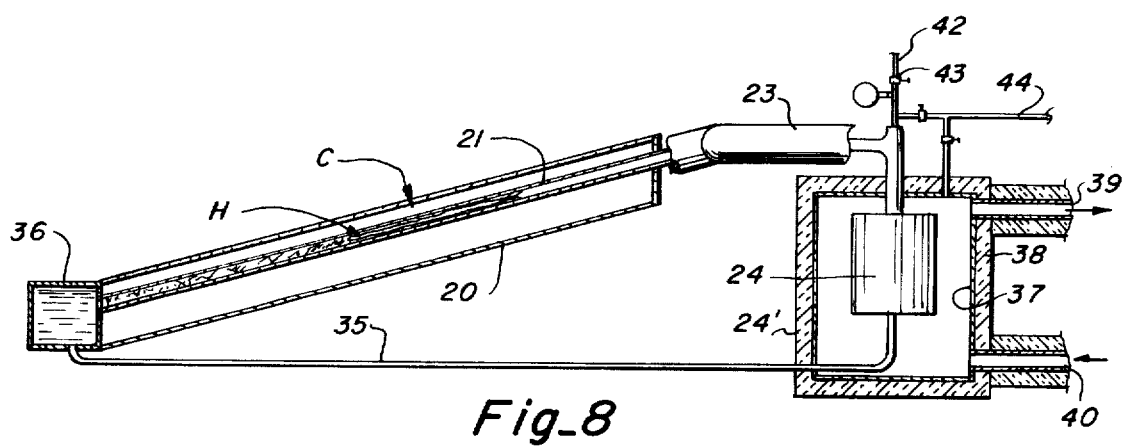
Fig_8

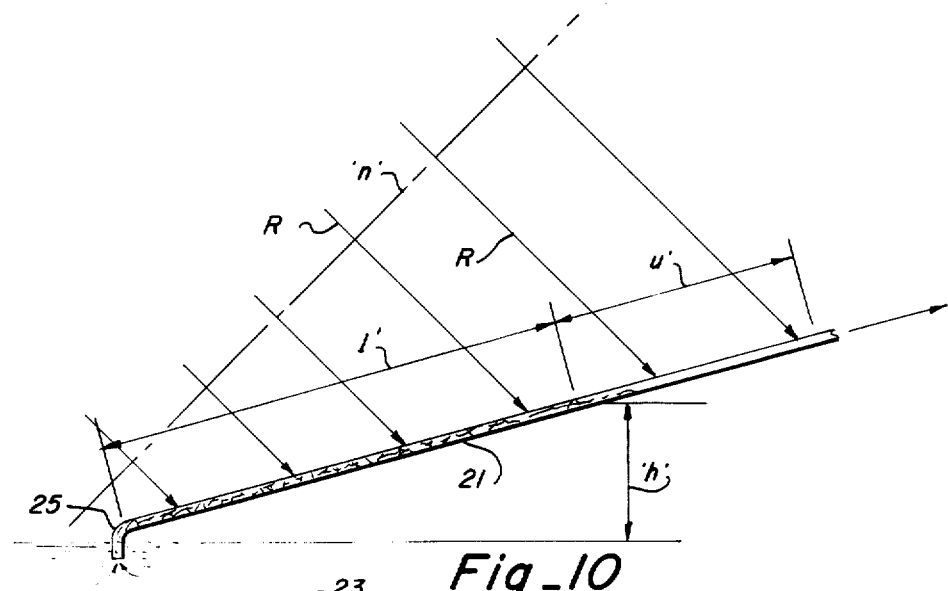
Fig_10
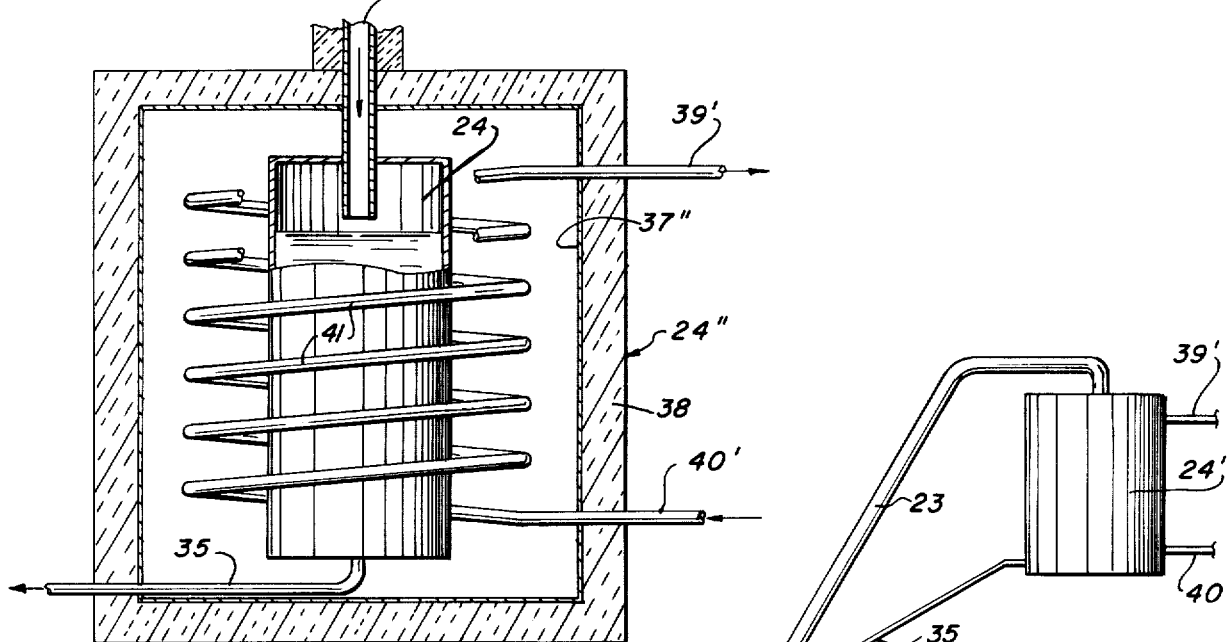
Fig_9
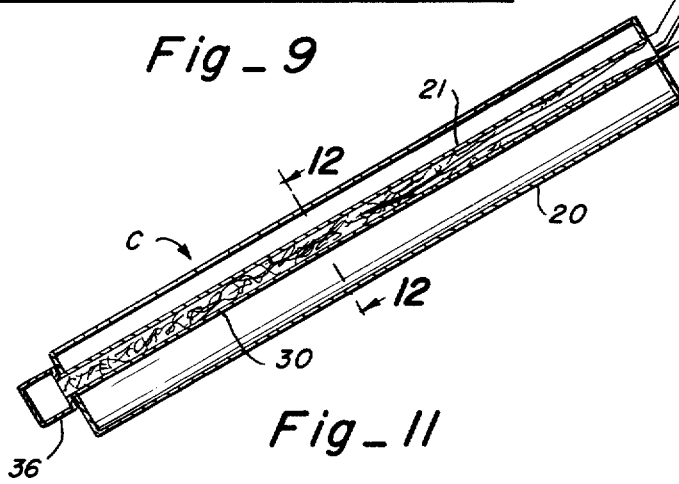
Fig_11
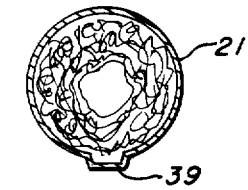
Fig_12

SOLAR THERMAL ENERGY COLLECTION SYSTEM

The present invention relates to apparatus which will utilize solar thermal energy, and more particularly to apparatus and methods for the utilization of solar thermal energy, hereinafter called "solar energy", for heating and water purification.

With the present energy shortage, considerable effort is being directed toward the use of solar energy to produce power and heat and to purify water. The utilization of solar energy necessitates the absorption of energy from the sun's rays and the engineering data developed to establish the actual amount of energy available from the sun has been quite extensive. Thus, an engineer may design a collector system at a specified location which will be based upon an evaluation of the average number of hours of sunlight available for a given period and the intensity of the solar energy per unit area of exposure during such period. On the other hand, whether for power generation, heating or water evaporation, the problems encountered in using the solar energy after it has been collected have not been fully solved. That is to say, while devices for using solar energy exist, no such device or combination of devices, when combined with a solar collector, has been found to be fully satisfactory from a practical commercial viewpoint.

The present invention was conceived and developed with the above and other considerations in view and comprises, in essence, the combination of a collector for receiving and concentrating the sun's rays to convert solar energy to heat energy at a comparatively high temperature, and a heat pipe arranged to absorb this converted heat energy to produce vapor which is transported to a condenser remote from the collector. There, the heat energy is released for other purposes as the vapor condenses. In such a basic combination, certain arrangements and structural considerations of the collector, heat pipe and condenser are desirable to improve the pereformance of the system for a given purpose. For example, it is possible to use an open or closed system in connection with the heat pipe, to better accomplish a specified purpose. It is also possible to control the temperature at which the heat pipe vapor may be maintained to transmit heat energy. A mode of operation is also possible where the system may be easily purged and cleaned when it is used for water purification operations such as desalting sea water.

It follows that the primary object of the invention is to provide a novel and improved system for the utilization of solar energy by an effective combination of a solar collector, a heat pipe and a condenser.

Another object of the invention is to provide a novel and improved apparatus for utilizing solar energy which converts solar energy to heat energy, instills the heat energy into a vapor and transports the vapor to a location where it can be used for various selected purposes.

Another object of the invention is to provide a novel and improved apparatus for the utilization of solar energy to desalt, purify and transport water, which evaporates and transports water vapor to a condenser.

Another object of the invention is to provide in such a system which uses solar energy to desalt sea water, a simple, effective means of purging the heat pipe portions of the system of salt and other impurities deposited therein while the system is operating.

Another object of the invention is to provide a novel and improved system capable of converting solar energy to heat energy for heating purposes, which is a simple arrangement of components and when combined with a heat storage facility, can power a heating system according to any selected schedule of operation.

Another object of the invention is to provide a novel and improved apparatus for converting solar energy to heat energy, and transporting the heat energy as through a heat pipe at various selected temperatures.

Other objects of the invention are to provide a solar energy collection system which is simple, inexpensive and effective.

With the foregoing and other objects in view, my present invention comprises certain constructions, combinations and arrangements of parts and elements as hereinafter described, defined in the appended claims and illustrated in preferred embodiment by the accompanying drawings in which:

FIG. 1 is a diagrammatic, three-dimensional view showing a solar energy collection system using channel-type solar collectors with open heat pipes extending through the channels to pick up and evaporate water from a source, pond or lake and to convey the vapor to a condenser as an open system.

FIG. 2 is a diagrammatic longitudinal sectional view showing a single channel and a condenser unit according to the arrangement shown at FIG. 1.

FIG. 3 is a transverse sectional view as taken from the indicated line 3—3 at FIG. 2, but on an enlarged scale.

FIG. 4 is a longitudinal sectional elevation through the lower portion of a single heat pipe and collector similar to the arrangement shown at FIG. 2, but on an enlarged scale to better indicate the arrangement of a wick within the heat pipe.

FIG. 5 is a diagrammatic, three-dimensional view of another type of solar collection system wherein the collector is a concave mirror and the heat pipe includes a compact unit at the focal point of the mirror.

FIG. 6 is a longitudinal sectional view as taken from the indicated line 6—6 at FIG. 5, but on an enlarged scale.

FIG. 7 is a diagrammatic, three-dimensional view showing a solar collection system similar to that shown at FIG. 1, but with heat pipes extending to the condenser unit and with a return line from the condenser unit and to the base of the heat pipes in the collector to provide a closed system.

FIG. 8 is a diagrammatic longitudinal sectional view showing a single channel and a condenser-heat-retaining unit according to the arrangement shown at FIG. 7.

FIG. 9 is a diagrammatic sectional view of a condenser-heat-retaining unit showing an arrangement somewhat different from that illustrated at FIG. 8.

FIG. 10 is a diagrammatic view of a heat pipe per se, such as illustrated at FIGS. 1 and 2, to indicate the slope of the pipe with respect to the horizontal and with respect to the angle of sun rays striking the pipe, to set forth the manner in which the heat pipe must be arranged for effective use in view of the limitations imposed upon the system by sunlight and by capillary action of water in a wick within the pipe.

FIG. 11 is a diagrammatic longitudinal sectional view of an arrangement similar to FIG. 8, but with the condenser-heat-retaining unit illustrated as being above the heat pipe so that the return flow from the condenser may enter the heat pipe from its top end to better effect the wetting of a wick within the heat pipe.

FIG. 12 is a transverse sectional view of the heat pipe as taken from the indicated line 12—12 at FIG. 11.

The collection and utilization of solar energy according to the present invention employs various arrangements and combinations of solar collectors and heat pipes. The first mentioned component, the solar collector, will be designed to receive solar energy over an area which is predetermined by field observation and tests to establish an annual average intensity of solar energy at the site of the collector or other comparable data. The collector, or an aggregation of collectors, will receive sunlight, that is solar energy, and reflect or concentrate the same to a point focus or a line focus which will significantly increase the temperature of the solar energy, and to a degree where a heat pipe may effectively absorb and transmit the same. It is to be noted that the temperatures at the focal points or lines of the collector may be well above the boiling point of water so that the solar energy will quickly and easily generate steam in the heat pipe.

A heat absorption end of a heat pipe is thus located at the focal point or along the reach of the focal line of a solar energy collector. The heat absorption end of a heat pipe may assume various forms. It may be a container where solar energy is focused to a point, or it may be a tubular member to lie along the reach of a focal line of the collector. In any event, this absorption end, a section, of the heat pipe is essentially part of a conduit having an absorbent wick in the absorption end which is heated by solar energy. An arrangement is necessary to keep this wick saturated with water, or any other suitable liquid, and to replenish the water as it is being continuously evaporated. The water vapor will expand through the heat pipe conduit away from the absorption end at the solar collector and to a condenser where the heat of vaporization is released as condensation of the water vapor or other vapor occurs.

The heat pipe may be an open or a closed system and this will depend to a great extent upon how the system is to be used. In the open system, the end of the pipe at the absorption end, or section, is submerged into a sump, or a lake or other body of water and the other end terminates at the condenser which may be a substantial distance away from the water source. This open system is especially useful for desalting water and also, at the same time, lifting and transporting the water. The solar energy introduced into this absorption end of the system will evaporate water and the vapor will easily flow through the heat pipe to the condenser even though the condenser is elevated above the absorption end or section of the heat pipe. The water released in the condenser will be pure, and accordingly the system is an effective water purifier. If it is to be used solely for this purpose, the heat generated as the water vapor condenses will be dissipated in any suitable manner as through fins or the like. However, the heat released can be used for other purposes such as for heating a building.

In the closed system, the heat pump includes a return line between the condenser and the base of the absorption end of the heat pipe, at the solar collector. In such arrangement, the water, or any other suitable fluid, is repeatedly used. Thus, the system would not be used for the purification of water and the utility of the system resides in beneficially using the heat energy released at the condenser. This heat energy may be used to heat a building, or used for producing hot water or even stored in a heat sink structure for a limited time period. Insofar as producing heat is concerned, the closed system is advantageous since liquids other than water may be used to permit the transportation of vapor at selected temperatures. Thus, if it were desirable to transmit heat at a comparatively low temperature, a highly volatile liquid such as a light hydrocarbon could be used. If it were desired to transmit heat at a temperature substantially above the boiling temperature of water, another type of liquid such as ethylene glycol could be used. Furthermore, a closed system can be operated independently of the ambient pressure, and where the liquid is water, the system can be operated at a sub-atmospheric pressure to cause the water to boil and vaporize at a temperature substantially lower than the normal boiling point of water and conversely, the system can be pressurized to require it to operate at a temperature significantly above the normal boiling point.

Referring more particularly to the drawings, FIG. 1 illustrates a system for purifying water exemplary of the present invention. A solar collector C is formed as an array of troughs 20 and a heat pipe H, having a multiple of heat absorption sections 21 within the troughs. These heat absorption sections 21 connect with an insulated manifold 22 which, in turn, joins an insulated conduit 23 which, in turn, terminates at a condenser 24. In the drawing, the conduit 23 is shown as broken to indicate that it may be of any selected length and in practical applications, this length may be substantial. FIG. 2 shows a similar organization to that at FIG. 1, but illustrates a single collector trough 20. A heat pipe H having an absorption section 21 in the collector trough 20 includes a conduit 23 extending therefrom and to a condenser 24. FIGS. 3 and 4 illustrate portions of this arrangement shown at FIG. 2 on an enlarged scale to exemplify in further detail the components as hereinafter described. Basically, this system, illustrated at FIGS. 1–4, is an open system and the end 25 of the absorption section of the heat pipe is turned downwardly into a water supply sump S to be submerged in the water therein. The condenser 24 includes a drain 26 to release water condensed therein to complete the system.

The inner face of each collector trough 20 is made of a reflective material such as aluminum, which is finished to effectively reflect sunlight, and especially infra red radiation. This trough 20, shown in section at FIG. 3, is shaped in a parabolic-like form to reflect the rays of the sun to, or approximately to, a focal line at the center of the trough. This focal line, which would appear as a point at FIG. 3 is conveniently within the embrace of the walls of the channel. Accordingly, the heat absorption section 21 of the heat pipe H will be located at this focal line to receive the reflected radiation. It may be suspended by suitably spaced straps 27 or the like, as indicated at FIG. 3. Since the heat pipe H will have an appreciable diameter which may be from 3 to 6 inches or even larger, it is not essential that the sun's rays reflect to a sharp focal line to strike the section 21. Thus, the configuration of the trough 20 may be selected in such a manner as to direct most of the reflected sun rays onto the heat pipe during an entire period of daylight and as the sun changes position. It is possible to rotate the collector trough 20 so that the sun is always directly above the heat pipe, but it is also possible to orient the collector trough so that it may remain at a fixed position and still properly reflect the sun's rays onto the heat pipe during a significant portion of the day.

The orientation of the troughs 20 will ordinarily be in a north-south direction and preferably, the troughs will be inclined with respect to the horizontal at an angle such that they will be normal to the direction of sun rays. As hereinafter explained further, this desirable inclination may not be possible, and the trough must be placed at a flatter angle to accommodate capillary movement of fluid through the absorption section 21 of the heat pipe H. The collector troughs 20, positioned in a desired manner, will be supported by any suitable structural arrangement as indicated by supports 28, and the units will be enclosed by a transparent cover 29, as indicated at FIG. 3, to minimize losses by air convection and reradiation.

The heat absorption section 21 of the heat pipe H, which lies along the reach of the pipe at the focal line thereof, has a diameter sufficient to permit a flow of water vapor through it without creating a significant back pressure. This section 21 will have a radiation absorptive surface, such as a surface of lamp black, which will effectively absorb all of the direct and reflected radiation from sunlight. The pipe is of a material such as metal which can withstand the temperatures imposed upon it which could be as high as 400° to 500° F. at times when the sun is quite bright, especially in the upper reach of this section where the pipe is filled with vapor. The lower reach of this section 21 within the trough 20 and the intake end 25 is filled with a tube of water absorptive material 30 such as fibers which may be of any hydrophilic material such as cotton, glass or metal. The water absorptive material may also be porous solids, such as sintered metal or open pore ceramics, or it may be threaded capillaries in the wall of the pipe. The absorptive material will pick up water in the sump S and flow into the absorption section 21 of the heat pipe by capillary action. The capillary action will effectively lift water from the sump S a selected height $h$, as indicated at FIG. 4, which will vary from a few inches to several feet, depending upon the type of absorptive material 30 and the density with which it is packed.

When a water absorptive material 30 is used, the height to which capillary action can effectively lift the water will be in the neighborhood of 2 to 3 feet. This lift $h$, which may be easily determined by experiment, will bring water into the absorption section wl of the heat pipe to be vaporized and the distance the water will flow into the pipe will be established by the slop of the pipe as in the manner indicated at FIG. 10.

Preferably, this distance should be in the range of two-thirds to three-fourths of the length of the absorption section 21 of the heat pipe which may be referred to as the lower reach $l$ of the pipe section 21. With this arrangement, solar energy striking this lower reach will be used to heat and vaporize water brought into the pipe by capillary action. The solar energy absorbed in the upper reach $u$ of the section 21 will be directed to increasing the temperature of the water vapor to effectively boost it through the conduit 23 and to the condenser 24. If the capillary action of the absorptive material 30 in the absorption section 21 of the pipe is not sufficient to produce the desired results, it may be necessary to submerge the end 25 of the heat of the pipe so that the pipe is below the water surface as in the manner indicated in dotted lines at FIG. 4. This raising of the water level in the absorption section 21 can also be aided by creating a vacuum in the absorption section 21 through operation of the condenser 24 which is described below.

In referring to FIG. 10, it is to be noted that the rays R of sunlight may necessarily be at an inclination with respect to the heat pipe instead of at the normal $n$ thereto which, in the latitudes of the U.S., would vary from 30° to 50°. In tropical areas where the sun is more nearly directly overhead and in the summer time, the normal $n$ of the sun's rays may be more nearly the same as the inclination of the pipe. Where the sun rays are sloped with respect to the inclination of the pipe, as shown at FIG. 10, it will be necessary to increase the length of the pipe to absorb the same amount of sunlight as would be absorbed if the pipe were at the normal $n$ to the direction of the sun's rays. However, although a longer pipe is required when the sun strikes the pipe at an angle, it has been found that the actual losses of radial thermal energy incurred by striking the trough and the heat pipe at such an angle are not significant.

The manifold and the conduit 23 from the heat absorption section 21 will be of a diameter sufficient to permit easy flow of the water vapor to the condenser 24. This conduit 23 will be well insulated to prevent heat loss and a reduction of vapor temperature to the point where water could condense in the conduit. The conduit 23 may be of considerable length and if necessary, a supplemental heating system by addition of trough-like reflectors may be provided to maintain the vapor temperature to a desired level until it reaches the condenser 24.

The condenser 24 is illustrated at FIGS. 1 and 2 as a simple container. However, it may be varied in its construction by the addition of cooling fins, not shown, or any other cooling device to dissipate heat released by condensation of the water vapor within it. As the water vapor condenses and accumulates within this condenser, it may be drawn off through outlet 26 for purposes such as domestic use and irrigation.

When this unit is used for water purification purposes, for example, where the water in the sump S is saline, the heat released at the condenser may not be important and it may be dissipated. However, this heat may be used for the heating of a building or the like, and the condenser 24 may be of a more elaborate construction as hereinafter further described. Where the saline water is purified, the salt in the water will be deposited in the heat absorption section 21 as water is evaporated, and unless removed, such salt will eventually clog the pipe 21. However, it is possible to easily purge the pipe 21 of such salts by filling this absorption section 21 of the heat pipe H with water from the sump S to permit that water to dissolve the salts accumulated within the pipe. This purging action may be easily accomplished on a daily basis and during nighttime when the sun is not operating the system by the simple expedient of closing all the valves at the upper end of the system to prevent the entry of air into the heat pipe H.

This closure of the conduits will create a vacuum in the conduit 23 as soon as the vapor therein cools, sucking up water from the sump into the lower section 21 of the heat pipe H. The following day, as the sunlight strikes the heat pipe, warming the same and forming vapor, the vacuum is released and the normal operation of producing vapor can commence. The drain 26 may then be opened to permit a flow of water from the condenser. A check valve, not shown, may be placed in this drain to make the operation automatic.

The embodiment of the invention shown at FIGS. 5 and 6 illustrates a modification of the open heat pipe system above described, wherein a mirror reflector M is used to reflect and focus sunlight at, or approximately at, a point where an absorption section 21' of a heat pipe H' is located. In this arrangement, the absorption section 21' is a container illustrated as a simple, closed box having a pickup tube 25' directed into a sump S. The absorption section 21' and the tube 25' are filled with an absorptive lining material 30 to pick up through capillary action sufficient water from the sump which will be heated and evaporated in the section 21' so that the vapor will move through a conduit 23' as hereinafter described. The mirror M may be arranged in any suitable manner and will be proportioned to cover a selected area to focus sufficient solar energy onto the absorption section 21' of the heat pipe to do the designated job. A plurality of mirrors may be used, if desired. Various ramifications to the design of such a mirror may be used to effectively focus the maximum amount of sunlight onto the absorption section 21' throughout a day. For example, the mirror may be mounted upon a circular track 35 to move with the sun and it may also be adapted to tilt, by mechanisms, not shown, in order to focus effectively fous the rays of sunlight onto the section 21' due to seasonal variations of the sun's position.

The apparatus shown at FIGS. 7 and 8 illustrates another embodiment of the invention where the heat pipe forms a closed system. At FIG. 7, a collector C is illustrated as a plurality of troughs wherein absorption sections 21 of a heat pipe are disposed to discharge into a manifold 22. The manifold extends to conduit 23 which in turn extends to a condenser 24'. In this closed system, a return line 35 extends from the condenser 24' to a pickup manifold 36 at the base of the collector 21. Aside from providing for the pickup manifold, the collector C and heat absorption sections 21 of the heat pipe H are the same as heretofore described. The condenser 24', however, is modified because this closed system must necessarily be used for the collection and transportation of heat energy, from the collector to the condenser and thence to a building or any other facility requiring the heat energy released at the condenser.

In the arrangement illustrated at FIGS. 7 and 8, the condenser 24' is formed with an inner container 24 whereinto the conduit 23 will flow and from which the return line 35 will discharge water. This inner section 24 is mounted within a larger tank 37 shielded by insulation 38 which will be filled with water or any other suitable heat absorption liquid, for heating purposes. As the liquid, ordinarily water, within the tank 37 is heated, it will circulate through a discharge line 39 and a return line 40. These lines 39 and 40 will extend to any suitable radiation system in a building or any other system where the heat energy is absorbed so that hot water from the discharge line 39 at the top of the container 37 will be cooled and returned to the container through the return line 40 at the bottom of the container and circulate in a normal pattern. The radiators or other facilities which use this heat energy are not shown since the same would be conventional structures and the system would operate in a conventional manner.

A modified arrangement of a condenser 24'' is shown at FIG. 9 where the inner condenser 24 of the system connects with conduit 23 and return 35. The outer container 37'' will be enclosed with insulation 38 as heretofore described. However, this will be a closed container and will be filled with water, or with eutectic salts or other material having desirable heat retaining characteristics. A heat conductive line having an outlet portion 39' and an inlet 40' extends into this outer tank 37'' as a continuous circuit forming a coil 41 which lies within the tank 37'' to absorb heat from the heat retaining material therein.

In operation of the closed system illustrated in FIGS. 7 and 8, and with a condenser 24'' such as illustrated at FIG. 9, the solar energy directed against the heat absorption section H as hereinbefore described, causes water vapor to flow from the section through the manifold 22 and conduit 23 to the receiving tank 24 within the condenser 24''. The heat released therefrom is absorbed into the heat retaining material within the receiving tank and the heat conductive line 39–40 will function to remove heat from the receiving tank as needed.

FIG. 11 illustrates a modified closed pipe system where the condenser 24' is located above the heat absorption section 21 of the heat pipe and the return line 35, from the condenser 24' is directed into the upper end of the absorption section 21 to permit water to flow downwardly through this absorption section and to the pickup manifold 36 at the base of the heat collector C. With this arrangement, it is possible to pick up and absorb moisture into the absorptive material 30 along the entire reach of the heat pipe. Where this arrangement can be used, it is especially suitable for a heat pipe absorptive section which must be set at a comparatively steep inclination and the effective height to which water will flow by capillary action, as from the pickup manifold 36, is not sufficient for the length of the section. In such an arrangement, the heat absorption section 21 may be modified by providing a small channel 39 at its underside to better restrain the water flowing through it, as illustrated at FIG. 12.

In the operation of a closed system, it is possible to use different fluids to permit the system to be operated at a selected temperature, although water is usually an ideal material since it has a high heat capacity and will vaporize at a temperature of 212°F. Thus, water is usually the best liquid for heating systems for buildings. Also, with water, the effective temperature of the system may be modified by operating at reduced pressure within the heat pipe. This will lower the boiling point temperature of the water. The temperature may be raised by increasing the pressure to increase the temperature at which the water boils. This is possible by the use of a valve inlet pipe having a bleed-off end 42. Such piping is illustrated at FIGS. 1, 2, 7 and 8 and may be arranged to add water to the system, as well as to permit a blow-off of vapor. A valve 43 at the bleed-off section 42 can be opened to permit vapor to flow therefrom to eliminate air from the system and thereafter the valve may be closed to permit the system to operate without any air in the heat pipe. However, when the temperature of the system drops, this closed system will be under a partial vacuum which may be relieved by opening the bleed-off to permit air to flow back into the system.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. Apparatus for the collection of solar energy, conversion of the same into heat energy and for transmitting the heat energy, the apparatus comprising:
    a. a solar energy collecting means adapted to receive and concentrate solar energy by the deflection of the same to a restricted space so as to increase the effective temperature in the space,
    b. a tubular heat conduit for conducting vaporous fluid therein, said heat conduit including a heat absorption section and a vapor conducting section, at least part of said heat absorption section being positioned within said solar energy collector means at said restricted space whereby the heat absorption section will receive concentrated solar energy in order to vaporize fluid therein and said vapor conducting section is joined to one end of said heat absorption section to permit vapor formed in said heat absorption section to pass outwardly therethrough;
    c. condenser means connected to said vapor conducting section adapted to receive and condense vapor flowing into it from said tubular heat conduit so as to extract the heat energy from said vapor, said condenser being remotely positioned away from said heat absorption section,
    d. fluid sump means, the end of said absorption section of said tubular heat conduit opposite said vapor conducting section being submerged in said fluid sump means; and
    e. means to transport fluid from said sump means into the heat absorption section of said heat conduit so that said fluid can be evaporated therein to form vapor to be conducted into said condenser for the transfer of heat energy, said transport means includes a fluid absorbent liner arranged around the inner surface of said absorption section and forming an inner liner extending along a substantial portion of the length of said section from the sump end, said interliner being open in the center portion to provide a passageway to allow the vapor to flow into said vapor conducting section, said fluid absorbent liner being capable of drawing the fluid by capillary action into the heat absorption section whereby the fluid will be converted by the solar energy into vapor for transfer of the energy to said condenser means.

2. In the apparatus defined in claim 1, wherein:
the condenser is formed as an inner chamber and a surrounding outer chamber, wherein said vapor conducting section extends to the inner chamber to permit vapor to condense therein and a heat receiving means within the outer chamber about the inner chamber to receive heat flow therefrom.

3. In the apparatus defined in claim 1 which further includes:
means to reduce internal pressure in the heat absorption section of said heat conduit whereby the fluid transport means is aided by the reduced pressure to draw additional quantities of the fluid from the sump into said heat absorption section.

4. In the apparatus as defined in claim 1 wherein
the solar energy collector means comprises a longitudinal reflector trough adapted to reflect sunlight along a focal line, and
the heat absorption section of the conduit is positioned along said focal line to receive the concentrated solar energy.

5. In the apparatus as defined in claim 1 wherein:
said tubular heat conduit is inclined upwardly with the vapor conducting section elevated above said heat absorption section, and
said condenser means includes a fluid outlet means connected to said tubular heat conduit so that the condensed fluid can return by gravity through said conduit into said fluid sump means, and
said sump means, heat conduit and condenser means are interconnected and hermetically sealed to form a closed arrangement to prevent loss of fluid to the atmosphere.

* * * * *